Figure 1:
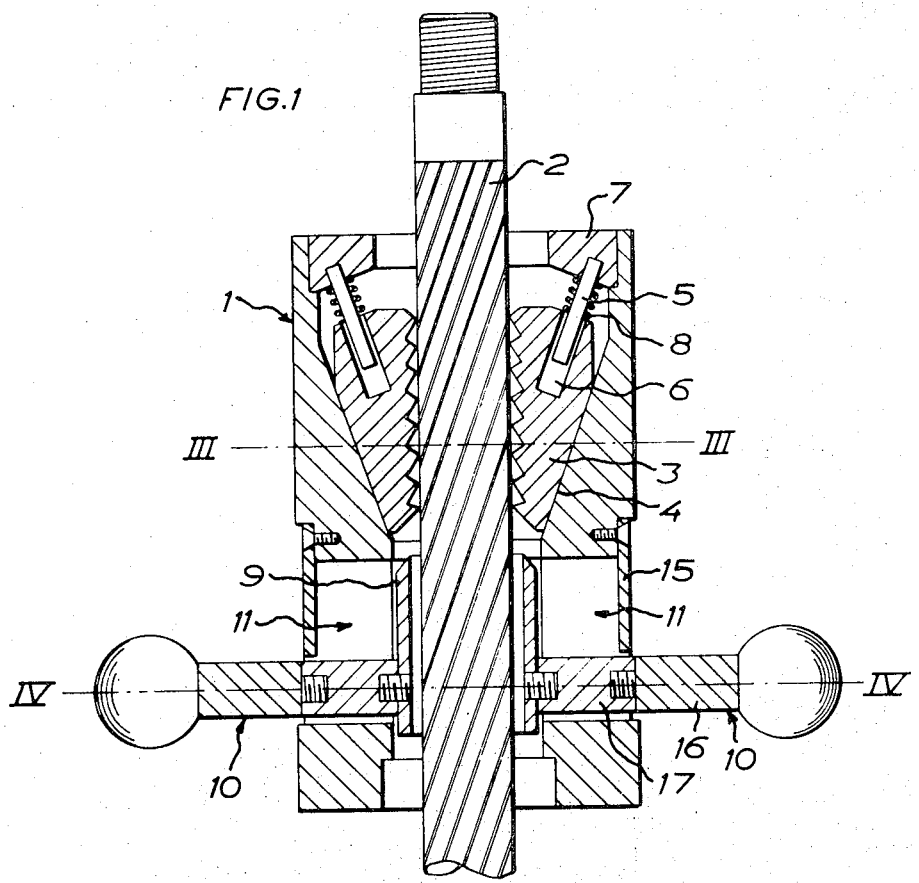

United States Patent
Ahlgren et al.

[11] 3,776,586
[45] Dec. 4, 1973

[54] GRIPPING DEVICE

[75] Inventors: Nils Harald Ahlgren, Saltsjobaden, Sweden; Odd Jahr, Hovik, Norway

[73] Assignee: Uddemann Byggteknik AB, Stockholm, Sweden

[22] Filed: Feb. 9, 1972

[21] Appl. No.: 224,681

[52] U.S. Cl............. 294/102 R, 24/136 R, 294/114
[51] Int. Cl............................................ F16g 11/10
[58] Field of Search............... 294/86 CG, 96, 102, 294/114, 116, DIG. 1, DIG.2; 24/115 R, 126 R, 126 L, 126 A, 126 C, 130, 132 HL, 136 R, 136 L, 136 B, 263 R, 263 SW, 263 C

[56] References Cited
UNITED STATES PATENTS

| 2,386,908 | 10/1945 | Puckett | 24/136 R |
| 23,894 | 5/1859 | Bentley | 24/136 R |
| 1,843,360 | 2/1932 | Handel | 24/126 C |

Primary Examiner—Evon C. Blunk
Assistant Examiner—Johnny D. Cherry
Attorney—Ralph E. Bucknam et al.

[57] ABSTRACT

A gripping device which is adapted to coact with a wire rope, bar or other load-carrying element, comprises a body embracing the element and has wedge-shaped clamping jaws which are arranged around the element, which cooperate with conical guides and are actuated by springs. This gripping device also has opening means consisting of a sleeve or like member for moving the jaws out of engagement with the load-carrying element against the action of the springs, the sleeve having at least one operating arm which projects outside the body of the gripping device and which serves to adjust the sleeve in relation to the body for moving the jaws into and out of engagement with the load-carrying element, and the operating arm is adapted to be latched to the body of the gripping device at least in that position in which the sleeve has moved the jaws out of engagement with the load-carrying element.

8 Claims, 4 Drawing Figures

GRIPPING DEVICE

This invention relates to a gripping device which is adapted to coact with a wire rope, bar or other load-carrying element. The gripping device comprises a body embracing the element and having wedge-shaped clamping jaws which are arranged around the element, cooperate with conical guides and are actuated by springs, said device also having opening means consisting of a sleeve or like member for moving the jaws out of engagement with the load-carrying element against the action of the springs. According to the invention, the sleeve has at least one operating arm which projects outside the body of the gripping device and serves to adjust the sleeve in relation to the body for moving the jaws into and out of engagement with the load-carrying element, and the operating arm is adapted to be latched to the body of the gripping device at least in that position in which the sleeve has moved the jaws out of engagement with the load-carrying element. This gripping device is of reliable operation and of simple construction, since the arms function both as operating means and as latching means.

Figure 3:
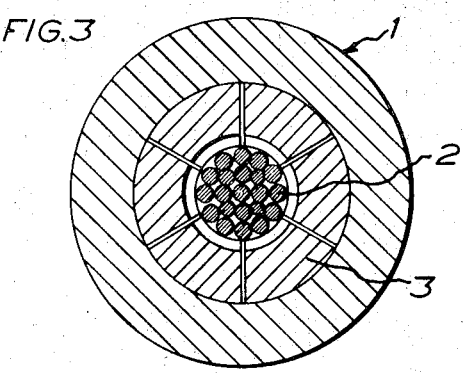
Figure 2:
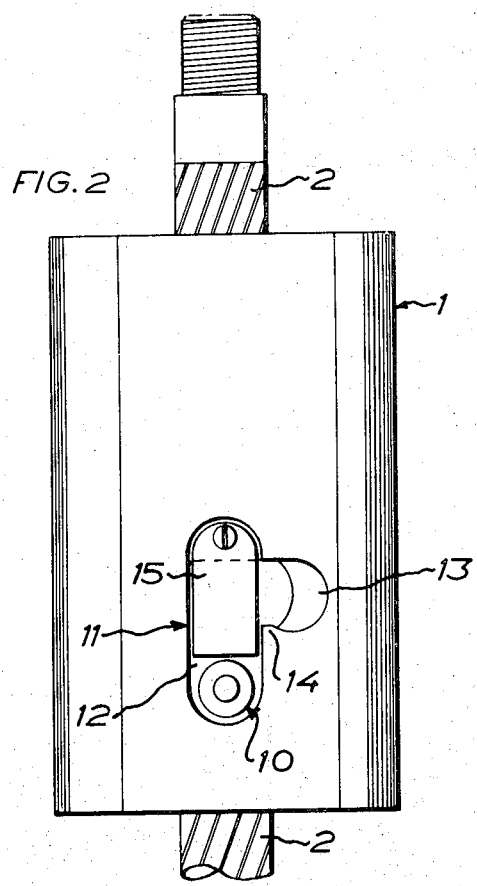
Figure 4:
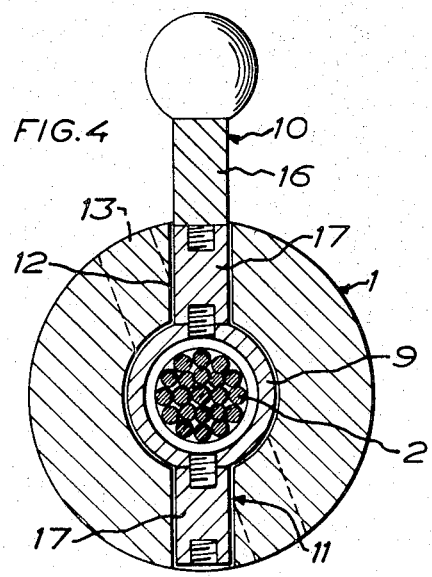

One embodiment of the invention will be more fully described hereinbelow with reference to the accompanying drawings illustrating the gripping device cooperating with a wire rope. In the drawings:

FIG. 1 is a longitudinal section of the gripping device;
FIG. 2 is a side view thereof; and
FIGS. 3 and 4 are cross sections of the gripping device on lines III—III and IV—IV in FIG. 1.

A body 1 suitably made in one piece embraces the load-carrying element which in the present instance is a wire rope 2. A number of wedge-shaped clamping jaws 3 are arranged within the body 1 and suitably oriented around the load-carrying element. This element being a wire rope 2 as shown in the drawing, the jaws 3 are uniformly distributed around the circumference of the wire rope, as will appear from FIG. 3. The jaws 3 cooperate with conical guides which ensure that the jaws can be moved into and out of engagement with the wire rope 2, and which include on one hand conical guide surfaces 4 in the body 1 of the gripping device, and on the other hand conically convergent studs 5 which are slidably received in conforming recesses 6 in the jaws 3. The studs 5 are mounted in an end piece 7 in the body 1, which end piece 7 is detachable so as to permit mounting of the gripping device. Springs 8 are interposed between the end piece 7 and the jaws 3 and tend to move the jaws 3 into engagement with the wire rope 2. The springs are in the form of coil springs passed onto the studs 5.

The gripping device includes opening means in the form of a sleeve 9 or like member for moving the jaws 3 out of their engagement with the wire rope 2 against the action of the springs 8. According to the invention, this sleeve 9 has at least one operating arm which projects outside the body 1 and serves to adjust the sleeve 9 with respect to the body 1 for moving the jaws 3 into and out of engagement with the wire rope 2. Besides the operating arm 10 is arranged to be latched to the body 1 at least in that position in which the sleeve 9 has moved the jaws 3 out of their engagement with the wire rope 2. To this end, the operating arm 10 coacts with a guide 11 arranged for the arm in the body 1 and serving as a latching means. To provide the latching action the operating arm 10 is turned about the axis of the sleeve 9.

In the embodiment illustrated the guide 11 provided for the operating arm 10 in the body 1 is substantially of L-shape, one L arm 12 being oriented in the axial direction of the sleeve 9 while the other L arm 13 is oriented substantially at right angles to the L arm 12. When swung into the part of the guide 11 formed by the L arm 13, the operating arm 10 is latched to the body 1 in that position in which the sleeve 9 has moved the jaws 3 out of engagement with the wire rope 2. The arm 13 of the L-shaped guide 11 is a bore which has been so formed with regard to the arm 12 that there is formed a shoulder 14 which prevents the operating arm 10 from being unintentionally swung out of its position in the L arm 13 of the guide 11.

The guide 11 coacts with a locking means 15 in the form of a plate so that the operating arm 10 can be securely held in the two extreme positions of the guide. The plate 15 is screwed to the body 1 in a position preventing the operating arm 10 to move in relation to the body 1. When the plate is screwed to the body 1 the operating arm 10 should occupy one of its two extreme positions, from which it cannot therefore be moved until the plate 15 has been released from the body.

The operating arm 10 is detachably connected to the sleeve 9 to make it possible to mount the gripping device. Moreover, the part 16 of the operating arm 10 which projects outside the locking means 15 can be detached from the remainder 17 of the operating arm 10. By this arrangement, the gripping device can be freed from any parts projecting outside the body 1, without jeopardizing the imperative latching function.

In the preferred embodiment of the gripping device illustrated in the drawings the sleeve 9 has two operating arms 10 diametrically mounted on said sleeve and extending outside the body 1. Each of said operating arms has one guide 11 to coact with.

The gripping device can either be used separately in combination with a load-carrying element, as illustrated in the drawings, or be incorporated in a jack assembly cooperating with the load-carrying element and serving to raise and/or lower said element.

It will be realized by those skilled in the art that the invention is not restricted to the preferred embodiment described in the foregoing and illustrated in the drawings, since modifications are conceivable within the scope of the appended claims.

What we claim and desire to secure by Letters Patent is:

1. A gripping device adapted for engagement with a load-carrying element comprising a first member which is perforated and defines a channel through which is adapted the load carrying element, wedge-shaped jaw members circumferentially arranged around said element capable of moving into and out of engagement with said load carrying member, conical guide members adapted to engage said jaw members, spring means for engagement of said jaw members with said element, means for engaging and disengaging all said jaw members with said spring means comprising a sleeve movable in the axial direction with respect to said first member, said sleeve being beneath said jaw members,- means for locking the jaws at least in the disengaged position, comprising at least one arm projecting externally with respect to said first member, said arm being adapted to be latched to said first member at least in said disengaged position, when the sleeve has moved the jaws out of engagement with said load carrying element.

2. A gripping device as claimed in claim 8 wherein the arm contacts with a guide arranged for said arm in said first member and the arm is turned about the axis of the sleeve for latching the arm by means of the guide.

3. A gripping device as claimed in claim 2, wherein the guide adapted to coact with the arm is substantially L-shaped, one member of said L being oriented in the axial direction of the sleeve while the other member is oriented substantially at right angle thereto, and said arm engages with the member in the axial direction in the position of engagement of the jaws and engages with the member at right angle thereto in the position of disengagement of the jaws.

4. A gripping device as claimed in claim 3, wherein locking means which comprise a plate are provided to hold said arm in at least one of the two extreme positions of the L-shaped member.

5. A gripping device as claimed in claim 4, wherein the part of the arm projecting outside the locking means is detachable from the remainder of the arm.

6. The gripping device according to claim 4 wherein said one of the two extreme positions of the L-shaped members is the position in which the sleeve has moved the jaws out of engagement with the load carrying element.

7. A gripping device as claimed in claim 1 wherein the arm is detachably connected to the sleeve.

8. A gripping device as claimed in claim 1 wherein the sleeve has two arms which are diametrically arranged thereon and project outside the body of the gripping device.

* * * * *

UNITED STATES PATENT OFFICE
CERTIFICATE OF CORRECTION

Patent No. 3,776,586          Dated December 4, 1973

Inventor(s) Nils Harald Ahlgren et al.

It is certified that error appears in the above-identified patent and that said Letters Patent are hereby corrected as shown below:

On the cover sheet, in the heading, insert --[30]

Foreign Application Priority Data:

Sweden          February 10, 1971      1628/71 --.

Signed and sealed this 18th day of June 1974.

(SEAL)
Attest:

EDWARD M. FLETCHER, JR.          C. MARSHALL DANN
Attesting Officer                 Commissioner of Patents